Oct. 31, 1967 E. B. MARJORAM ET AL 3,350,546

TAPE READER

Filed Feb. 18, 1963 2 Sheets-Sheet 1

INVENTORS:
Ernest B. Marjoram
William Ronald Swift

By Jess M Roberts
Attorney

TAPE READER

Filed Feb. 18, 1963 2 Sheets-Sheet 2

INVENTORS:
Ernest B. Marjoram
William Ronald Swift
By Jean M Roberts
Attorney

United States Patent Office 3,350,546

Patented Oct. 31, 1967

3,350,546

TAPE READER

Ernest B. Marjoram, West Covina, and William R. Swift, Placentia, Calif., assignors to Beattie-Coleman, Inc., Anaheim, Calif., a corporation of California Filed Feb. 18, 1963, Ser. No. 259,251
19 Claims. (Cl. 235—61.11)

This invention relates to means for reading a multiple channel perforated tape, for example, a reading means for a programmer or timer-programmer, in which multiple switches are mechanically operated by the perforations of a traveling tape.

Typically a device for this purpose comprises a reading head and an associated sprocket drum for driving the tape past the reading head. The reading head has a row of switches registered with the perforation channels of the tape and the sprocket drum which supports the tape is provided with multiple circumferential grooves into which the switch operating members extend when permitted by the perforations of the traveling tape.

One object of the invention is to eliminate certain shortcomings that characterize such tape readers as heretofore constructed. One of these shortcomings is the mechanical wear created by friction between the switch operating members and the sprocket drum when the operating members extend through the perforations of the tape. Another shortcoming of electrical origin is inductive pitting of the sprocket drum, which pitting not only damages the surface of the drum but also increases the wear caused by friction between the drum and the switch operating members.

A further electrical disadvantage is that the switches are not completely isolated from each other, the case or supporting structure of the programmer being a common ground for all of the multiple circuits controlled by the switches. In one prior art arrangement the sprocket drum itself functions as one of the two cooperative contacts for each of the multiple switches and thus makes inductive pitting of the sprocket drum inevitable. In another prior art arrangement, an arm of each switch cooperates with a corresponding fixed contact and falls away from the fixed contact against the sprocket drum whenever the arm registers with a tape perforation. Consequently the sprocket drum is electrically connected to one side of each circuit when the corresponding switch is open.

The present invention avoids all of these difficulties by mounting self-contained switches in the reading head and by providing the sprocket drum with multiple circumferential grooves which are dimensioned to clear the switch operating members when the switch operating members extend through the tape perforations. Wear between the drum and the switch operating members is completely eliminated.

In this regard a further advantage of the invention is the use of resilient fine wires as switch arms with the wires bent for cooperation with the traveling tape. Only insignificant wear occurs between the traveling tape and the switch arms and the smooth gradual bends of the wire arms have no troublesome wear effect on the leading edges of the tape perforations.

The new arrangement completely eliminates inductive pitting of the sprocket without the necessity of insulating the whole support structure. In addition, the new arrangement of self-contained switches permits the switches to be connected to individual circuits with all of the circuits completely isolated from each other.

Other objects of the invention relate to the problem of providing such a tape reader that may be reproduced in quantity with the required high degree of precision in all of its dimensions and dimensional relationships. This problem may be appreciated when it is considered that thirteen perforation channels are located within a width of less than an inch and both the corresponding thirteen switch arms of the reading head and the corresponding thirteen circumferential grooves of the sprocket drum must register accurately with the thirteen perforation channels on the traveling tape. Not only must the reading head be in accurate alignment with both the tape and the grooved drum but also the reading head must be properly spaced from the surface of the traveling tape for dependable operation of the switch arms.

As will be explained, correct spatial relationships among the traveling tape, the sprocket drum and the reading head are created and maintained by mounting the reading head in a floating manner, by providing self-centering alignment engagement of the reading head with the sprocket drum and by constructing the sprocket drum for engagement with the tape with centering effect on the traveling tape. In addition, the resilient wire switch arms are constructed for operation through a liberal range of spacing of the switch arms from the surface of the traveling tape to permit corresponding liberal tolerance in the spacing of the head from the traveling tape.

The remaining problem is to mount the multiple switches in the reading head with the required accuracy and to do so in a manner which permits economical production of the reading head. The difficulties involved may be appreciated from the fact that the multiple switches must be mounted well inside the reading head at a center-to-center spacing between the successive switches of only 0.070 inch.

The invention approaches this problem by employing a laminated reading head comprising plates of nonconducting material stacked face to face with the faces of the plate relieved or cut away adjacent edges of the plate to form appropriate deep recesses in the stack for receiving the individual switches. Assembly is simplified because the switches may be mounted on the cut-away portions of the individual plates before the plates are assembled in a stack.

The laminated construction creates another problem, however, in that tolerance in the dimensions of the individual plates creates an unacceptable accumulated tolerance across the stack of plates. Thus fourteen plates are required to form thirteen recesses for mounting the switches and with each plate of a thickness of 0.070+0.001/—0.000 inch the accumulated tolerance may be as high as 0.014 inch, whereas the tolerance in the total dimension across the stack should be on the order of only 0.001 inch.

The problem of accumulated tolerance is met by forming the faces of the plates with a number of small projections of relatively small area and by compressing the stack of plates to cause the small projections to yield elastically for reduction of the accumulated tolerance. For example, in a successful practice of the invention, the thickness of each plate including its projections is 0.070 +0.001/−0.000 inch, this tolerance being easily maintained by injection molding. The height of the projections is 0.002±0.001 inch. The stack of fourteen plates is compressed to an overall of dimension of 0.980 inch (14 times 0.070 inch) within the desired overall tolerance of ±0.001 inch. Since the relatively small area projections are placed under high unit pressure, preferably within their elastic limits, it is the projections that yield rather than the body portions of the plates with the result that the reduction of the accumulated tolerance is divided among all of the plates. Consequently the switch-receiving recesses formed by the stack of plates are correspondingly uniformly spaced across the compressed stack.

The features and advantages of the invention may be understood by reference to the following detailed description and the accompanying drawing.

In the drawings, which are to be regarded as merely illustrative:

Figures 1, 2, 3, 4, 5:
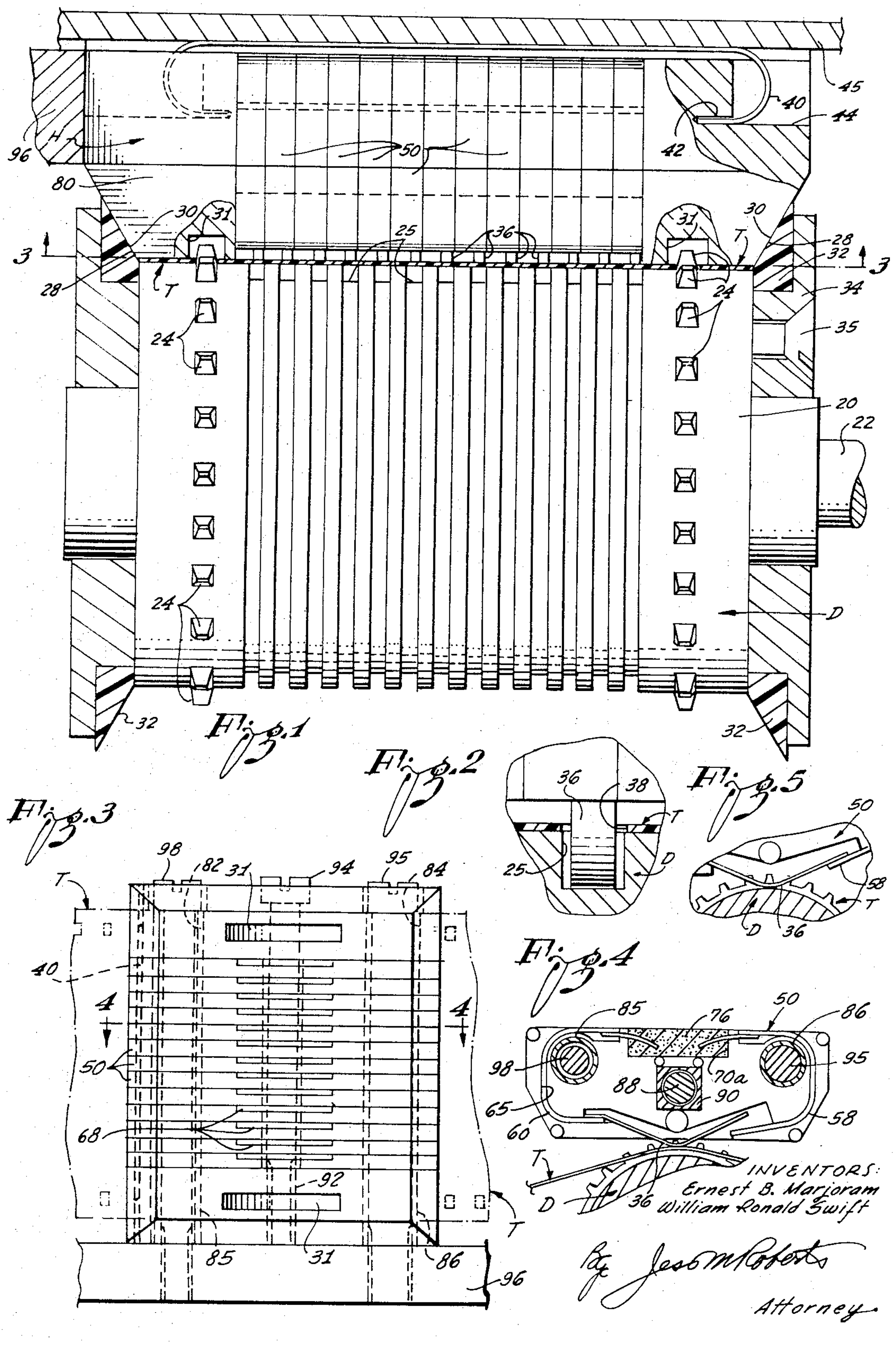
FIG. 1 is an enlarged fragmentary sectional view showing how a traveling tape passes between the reading head and the associated sprocket drum.
FIG. 2 is an enlarged detail of FIG. 1 showing how a groove of the drum clears a switch arm when the switch arm extends through a perforation in the traveling tape.
FIG. 3 is a bottom plan view of the reading head with the switches removed to show clearly the recesses in which the switches are mounted.
FIG. 4 is a sectional view of the reading head and the associated sprocket drum showing the position of a switch arm in the absence of a perforation in the traveling tape.
FIG. 5 is a fragmentary view similar to FIG. 4 showing how the switch arm extends through a perforation in the traveling tape.

FIG. 1 shows an arrangement for accurately relating the drum and the reading head with the traveling tape. The drum, generally designated D, has a body 20 that is fixedly mounted on a power actuated drive shaft 22, the body being formed with sprocket teeth 24 to engage sprocket holes in a tape that is generally designated T and being further formed with thirteen circumferential grooves 25 to register with the thirteen channels or rows of perforations on the tape. The two opposite ends of the drum D are provided with radial flanges which are tapered to form opposite conically curved surfaces 28, the angle of taper being 60° in this instance. The oppositely inclined conical surfaces 28 form a tapered seat for a reading head, generally designated H, which is tapered to the same degree to provide two oppositely inclined planar surfaces 30 to seat against the revolving drum in a self-centering manner, the head H being floatingly mounted to yield to the self-centering forces. The reading head has recesses 31 (FIGS. 1 and 3) to clear the sprocket teeth 24, the recesses being substantially wider than the sprocket teeth to avoid interfering with the self-centering action of the reading head.

In this particular embodiment of the invention the two oppositely inclined conically curved surfaces 28 are provided by a pair of nylon rings 32 which are held in place by corresponding retainer plates 34, the retainer plates being removably mounted on the opposite ends of the drum by suitable screws 35.

The reading head H incorporates thirteen switches corresponding to the thirteen channels or rows of perforations on the tape and each switch has an operating arm or operating contact 36 which is biased toward the traveling tape and whenever a perforation of the tape registers with one of the operating arms 36, the operating arm extends through the perforation into the corresponding groove 25 of the sprocket drum. Thus FIG. 2 shows a switch arm 36 extending through a perforation 38 in the tape T into the corresponding groove 25 of the sprocket drum and it is important to note that the extended switch arm does not make contact with the walls of the groove.

It is contemplated that suitable means will be provided to yieldingly urge the floatingly mounted reading head into the tapered seat provided by the rotating drum. For this purpose the reading head may be provided with a spring wire 40 that is bowed upward from the head. In the construction shown, the opposite ends of the spring wire 40 are seated in blind bores 42 in the head and are slidingly confined by adjacent slots 44 at the opposite ends of the head. A lid 45 is spaced slightly above the reading head and is normally releasably latched at a closed position shown in FIG. 1, the closed lid depressing the bowed spring wire sufficiently to urge the head into the tapered seat.

The described construction permits a liberal range of dimensional tolerances. The combined tolerances cause variations in the spacing of the seated head from the traveling tape but the range of operation of the switch arms 36 is ample to make the switches operative throughout a liberal range of variation of this spacing. In practice the combined tolerances involved cause the spacing of the reading head from the sprocket drum to vary between a minimum of 0.005 inch and a maximum of 0.015 inch. Since the tape has a thickness of 0.004 inch within an exceedingly close tolerance, it is apparent that the spacing of the reading head from the surface of the traveling tape varies between approximate limits of 0.001 inch and 0.011 inch.

Each switch arm 36 is a lever arm with the tape acting on an intermediate point of the lever arm and the range of movement of the free end of the lever arm at the switch gap is approximately 70% greater than at the intermediate point. The amount of movement imparted to the intermediate points of the switch arms 36 by the traveling tape varies inversely with the spacing of the reading head from the tape and, of course, this variation is increased at the free ends of the switch arms. Thus, 0.010 inch change in spacing of the reading head from the tape produces approximately 0.017 inch change in the separation of the switch contacts.

The conical surfaces 28 of the two nylon rings 32 are accurately spaced apart to confine the opposite longitudinal edges of the traveling tape throughout the range of tolerance in width of the tape. If the tape is wider than the spacing of the two nylon rings, the opposite edges of the tape climb the slopes of the conical surfaces 28 with a centering action on the tape. Thus the tapered flanges of the sprocket drum not only serves the function of centering the reading head relative to the sprocket drum but also serves the function of centering the traveling tape relative to the sprocket drum.

As heretofore indicated the preferred practice of the invention is characterized by a reading head of laminar construction comprising a stack of compressed plates of nonconducting material. For this purpose medium impact styrene plates produced by injection molding have been found to be sufficiently resiliently deformable to be fully satisfactory. At least one of the two faces of each plate is relieved or cut away so that the plates when stacked together cooperate to form suitable recesses in which the multiple switches may be mounted. In the present practice of the invention each of the plates is relieved on only one side and fourteen plates are stacked together to provide the required thirteen switch-mounting recesses, the relieved portion of the fourteenth plate not being utilized.

Figures 7, 8:
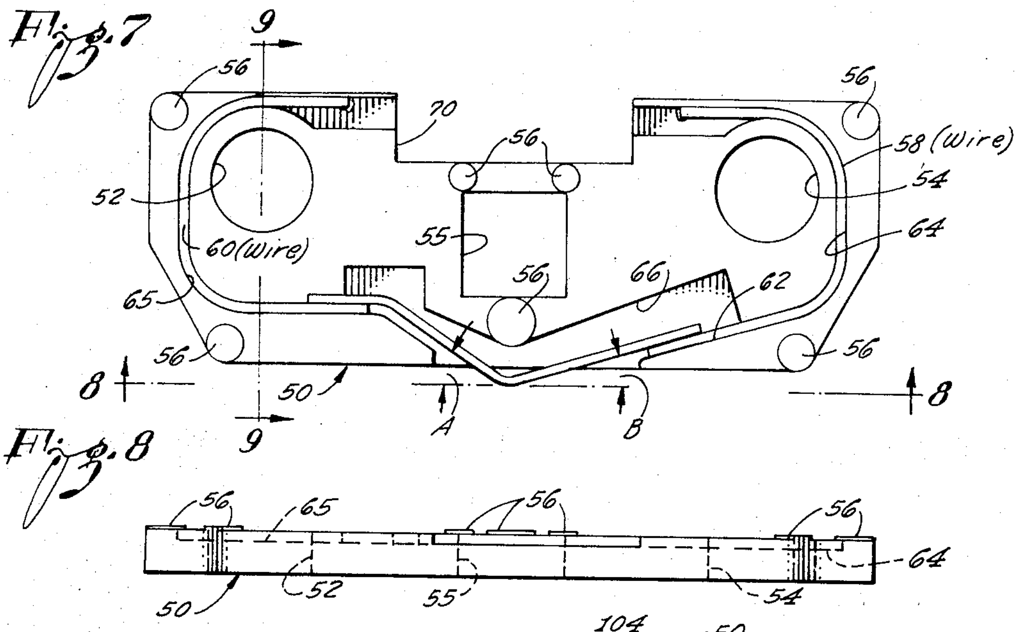
FIG. 7 is an enlarged face view of one of the molded plates that is employed in the stack.
FIG. 8 is a longitudinal edgewise view of the same plate.

In the present practice of the invention, as best shown in FIG. 7, each of the plastic plates, which is generally designated 50, is formed with two circular openings 52 and 54 near its respective ends and is further formed with a central square opening 55. One face of the plate 50, the face shown in FIG. 7, is further formed with a plurality of small projections in the form of flat bosses 56 which are suitably distributed over the area of the plate to receive the compressive force that is applied to the stack of plates.

The same face of the plate 50 is suitably relieved or cut away for the mounting of a switch which comprises a short formed wire 58 and a longer formed wire 60 both of which may be 28 gage spring wire. An end portion 62 of the shorter wire 58 serves as the fixed or static contact of the switch and a relatively long end portion of the longer wire 60 forms the previously mentioned movable contact or switch arm 36.

The plate 50 has a curved groove 64 to seat the intermediate portion of the shorter wire 58 and has a similar curved groove 65 to seat the intermediate portion of the longer wire 60. In addition the plastic plate 50 is cut away to from a relatively wide groove 66 in which the spring action of the switch arm 36 occurs, this wide groove opening onto one edge of the plate so that when the plates are stacked together as shown in FIG. 3, the wide grooves form corresponding switch recesses 68 in the stack which open onto what may be termed the bottom side of the stack.

Figure 6:
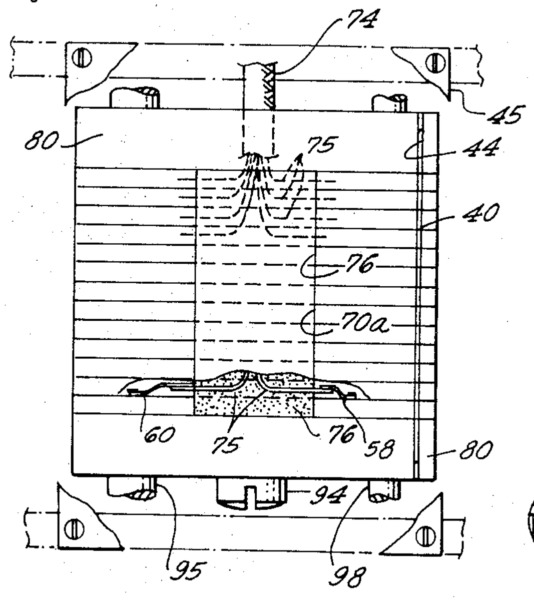
FIG. 6 is a plan or top view of the reading head with a portion broken away.
Figure 9:
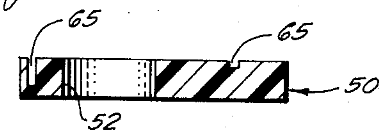
FIG. 9 is a transverse section of the plate as seen along the line 9—9 of FIG. 7.

The edge of each plate 50 that is opposite from the wide groove 66 is cut away to form a large rectangular recess or notch 70 and, as indicated in FIG. 6, when the plates are stacked together the rectangular notches 70 form a longitudinal trough **70*a* into which the fixed ends of the various wire elements 58 and 60 extend for connection to the circuit wires. FIG. 6 further shows how a cable 74 may comprise a bundle of insulated conductors 75 for connection respectively to the individual ends of the spring wires 58 and 60. After the switch connections are made the longitudinal trough 70*a* may be filled with protective potting material 76** as indicated in both FIGS. 5 and 6.

For the purpose of placing the stack of plates 50 under compression and for maintaining the stack permanently compressed, the stack of plates is sandwiched between two clamp members 80 which are relatively thick and which are formed with the previously mentioned inclined surfaces 30 that seat against the tapered nylon rings 32. The clamp members 80 may be made of anodized aluminum. Each of the clamp members has a bore 82 (FIG. 3) which is aligned with the circular openings 52 of the plates 50 and further has a second circular bore 84 which is aligned with the circular openings 54 of the plates. Two thin-walled metal tubes 85 and 86 serve to hold the stack of plates and the two clamp members in accurate alignment, the tube 85 fitting snugly into the aligned openings 52 of the plates and the corresponding bores 82 of the two clamp members and the metal tube 86 fitting snugly in the aligned circular openings 54 of the plates and the corresponding bores 84 of the two clamp members.

The assembled plates 50 are placed under permanent compression for accurate positioning of the switches by menas of a tension bolt 88 and a cooperating spacer bar 90. The spacer bar 90 is of square cross section to fit into the aligned square openings 55 of the stacked plates 50 and is of precisely the length of the dimension to which the stacked plates are to be compressed. The square spacer bar 90 is hollow to receive the tension bolt 88 and abuts at its opposite ends the inner faces of the two clamp members 80. Each of the two clamp members 80 is bored to receive the tension bolt 88 with one of the bores formed with screw threads 92 (FIG. 3) for threaded engagement with the leading end of the bore. Thus with the head 94 of the tension bolt 88 in abutment with one of the two clamp members 80 and with the leading end of the tension bolt threaded into the other clamp member, tightening of the tension bolt compresses the stack of plates to the extent permitted by the length of the hollow spacer bar 90. As heretofore stated it is contemplated that the stack of fourteen plates will be compressed to an overall dimension of 0.980±0.001 inch and therefore the exact length of the spacer bar 90 is 0.980±0.001 inch.

With the abutting areas of the stacked plates restricted to the areas of the flat bosses 56 the tightening of the tension bolt produces adequate pressure to cause the bosses to yield sufficiently for compression of the stack of plates to the length dimension of the spacer bar 90. It is to be noted that the flat bosses 56 are well distributed to distribute the concentrated compressive forces.

The reading head H may be floatingly mounted in any suitable manner for self-centering contact with the sprocket drum D. In the present embodiment of the invention the reading head is both pivotally and slidingly mounted on a headed pin 95 which extends through the metal tube 86. As indicated in FIG. 3, the headed pin 95 is fixedly mounted by screw threads on a support wall 96. The length of the hinge pin 95 is sufficiently greater than the corresponding dimension of the reading head to give the reading head the desired degree of freedom for movement along the axis of the hinge pin. In the present embodiment of the invention the exposed length of the hinge pin 95 is at least 0.040 inch longer than the corresponding overall dimension of the reading head.

A second headed pin 98 that is supported in the same manner extends through the other metal tube 85 and this second pin is sufficiently smaller in diameter than the inside diameter of the tube 85 to provide the desired degree of freedom for angular movement of the reading head about the axis of the hinge pin 95. In the present embodiment of the invention the second pin 98 is of a diameter that is 0.030 inch smaller than the inside diameter of the corresponding metal tube 85. The resulting range of swinging movement of the reading head is adequate to provide full freedom for the previously mentioned spring wire 40 to yieldingly urge the reading head against the traveling tape when the spring wire is stressed by the closed lid 45. Thus the reading head is floatingly mounted both with respect to freedom for translation axially of the pivot pin 95 and with respect to angular movement about the axis of the pivot pin.

Referring again to FIG. 7, the angle A of the bend in the wire 60 at the base end of the switch arm 36 is preferably 30° and the angle B of the bend at the heel of the switch arm is preferably 15° with an inside radius of bend at the heel of ⅛ inch. When the switch arm is in the closed position shown in FIG. 7, the heel of the switch arm may protrude from the reading head between 0.025 and 0.030 inch. The reading head is bi-directional in the sense that the tape may travel in either direction.

From the foregoing description of the selected embodiment of the invention it is readily apparent that the tape reader overcomes the previously mentioned shortcomings of prior art devices. The lightly biased spring wire switch arms 36 with their rounded heel bends cause but little wear on the traveling tape with special reference to the vulnerable leading edges of the perforations of the traveling tape. Since the switch arms make no contact whatever with the rotating sprocket drum there is no wear whatsoever between the switch arms and the sprocket drum. The wireform switch arms are exceedingly light with corresponding small inertia. All of the circuits may be completely isolated from each other with no tendency for inductive pitting of the sprocket drum.

With reference to economy, it is to be noted that the plastic plates 50 that form the laminated reading head may be produced in quantity with the required tolerance by injection molding at relatively little cost. It is also to be noted that the procedure of assembling the reading head is a relatively simple task requiring no skill whatsoever.

An outstanding feature of the invention is that the required close tolerances may be achieved in mass production at low cost. Since the sprocket drum is not subject to wear by the switch arms and is not subject to inductive pitting, the drum may be a machined part of inexpensive metal. A further consideration with reference to economy is that it is a simple matter to substitute one stack of plastic plates 50 for another stack in the reading head whenever it is desired to renew the working parts of the reading head and whenever it is desired to change the number of switches in the reading head either by adding additional plates to the stack or substituting a stack of thinner plates.

Figure 10:
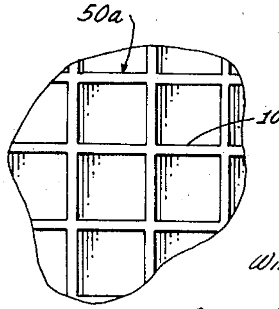
FIG. 10 is a fragmentary face view of a molded plate employed in an alternative practice of the invention in which the small area projections on the plate are in the form of ribs.

FIG. 10 indicates how the plastic plates that are stacked together to make a reading head may be formed with projections that differ from flat bosses. The plastic plate 50*a* has ribs 102 that serve the same purpose as bosses. In the construction shown, the ribs 102 intersect to form a waffle pattern and the total area of the intersecting ribs 102 is sufficiently smaller than the total area of the plastic plate to cause the ribs to yield in response to compression in substantially the same manner as the previously described flat bosses.

Figure 11:
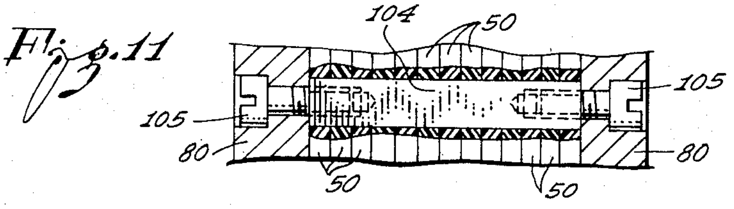
FIG. 11 is a fragmentary sectional view showing an alternate arrangement for holding the stack of plates of the head under compression.

FIG. 11 shows how a spacer bar 104 and a pair of cooperating screws 105 may be substituted for the previously described spacer bar 90 and cooperating tension bolt 88. The spacer bar 104 extends through the stack of plates 50 in abutment with the two clamp members 80 in the previously described manner and the two screws 105 hold the two clamp members against the two ends, respectively, of the spacer bar.

Our description in specific detail of the selected embodiment of the invention will suggest various changes, substitutions and other departures from our disclosure within the spirit and scope of the appended claims.

We claim:

1. Means to read a multiple channel tape, comprising:
guide means contiguous to one face of the tape to guide the tape along a given path relative to the guide means,
said guide means having outwardly inclined surfaces on opposite sides of the path of the tape forming a tapered seat centered relative to the path;
a reading head having multiple reading elements corresponding to the multiple channels, said head being tapered to engage said seat to be centered thereby relative to the path of the tape; and
means to floatingly mount said head and urge the head into said seat.

2. A combination as set forth in claim 1 in which said outwardly inclined surfaces cooperate to engage the opposite longitudinal edges of the tape to guide the tape.

3. Means to read a multiple channel tape, comprising:
guide means in the form of a roller in abutment with one face of the tape to guide the tape along a given path relative to the roller,
said roller having outwardly inclined conical surfaces at its opposite ends forming a tapered seat centered relative to the path;
a reading head having multiple reading elements corresponding to the multiple channels,
said head being tapered to engage said seat to be centered thereby relative to the path of the tape; and
means to yieldingly urge said head into said seat.

4. A combination as set forth in claim 3 in which said conical surfaces are surfaces of a low friction plastic material.

5. Means to read a multiple channel tape, comprising:
guide means contiguous to one face of the tape to guide the tape along a given path relative to the guide means,
said guide means having outwardly inclined surfaces on opposite sides of the path of the tape forming a tapered seat centered relative to the path;
a reading head having multiple reading elements corresponding to the multiple channels, said head being tapered to engage said seat to be centered thereby relative to the path of the tape;
means to pivot said reading head on a transverse axis for swinging movement of the head towards said seat,
the head being mounted on said pivot means for freedom to shift axially of the pivot means to permit centering of the head in the seat; and
yielding means to urge the head pivotally towards the seat.

6. Means to read a multiple channel tape, comprising:
a guide roller contiguous to one face of the tape to engage and guide the tape, said guide roller being formed with multiple circumferential grooves to register with the channels on the tape,
said guide roller having tapered circumferential end flanges;
a reading head having multiple reading elements corresponding to the multiple channels, said head being tapered to engage said end flanges to be centered thereby relative to the tape;
means to pivot said reading head on a transverse axis for swinging movement of the head toward said end flanges; and
yielding means to urge the head pivotally toward the flanges.

7. Means to read a tape having a plurality of channels in the form of perforations, comprising:
a reading head positioned across the path of the tape adjacent one face thereof and having a corresponding plurality of switches registered with said channels respectively;
said switches having operating members yieldingly pressing against the tape to enter said perforations and to extend beyond the perforations into said grooves of the support means,
said grooves being dimensioned to avoid contact with the switch members;
support means adjacent the other face of the tape opposite from the head to hold the tape close to the head,
said support means having a corresponding plurality of longitudinal grooves registered with said channels respectively; and
insulated conductors carried by said head and connected to said switches for connecting the switches to outside circuitry.

8. Means to read a tape having a plurality of channels in the form of perforations comprising:
a corresponding plurality of switches arranged in a row across one face of the tape to register with said channels respectively,
each of said switches having a contact and a cooperating resilient switch arm movable between an open position and a closed position,
an intermediate portion of said switch arm being biased towards the tape for operation of the switch arm by entering perforations in the tape;
insulated conductors connecting the opposite sides of said switches with outside circuits; and
support means for the tape adjacent the other face of the tape opposite from the switches,
said support means having a corresponding plurality of recesses registered with said channels and dimensioned to clear said switch arms when the switch arms extend through the perforations thereby to keep the support means insulated from the circuits.

9. A combination as set forth in claim 8 in which said switch arms are resilient wires having bent offsets directed toward the tape.

10. A combination as set forth in claim 9 in which the offset portions of the wires are at less than 40° angles relative to the plane of the traveling tape.

11. Means to read a tape having a plurality of channels in the form of perforations, comprising;
a reading head of nonconducting material positioned across the path of the tape adjacent one face thereof and
having a corresponding plurality of recesses registered with said channels respectively;
a corresponding plurality of switches mounted in said recesses respectively, said switches having operating members yieldingly pressing against the tape to enter said perforations and to extend beyond the perforations;

insulated conductors carried by said head and connected to said switches to connect the switches to outside circuits; and a guide roller engaging the tape adjacent the other face of the tape opposite from the switches and having a plurality of circumferential grooves registered with said channels to clear said switch arms when the switch arms extend through the perforations thereby to keep the guide roller insulated from the circuits.

12. A combination as set forth in claim 11 in which said guide roller has tapered flanges; in which said head is tapered to seat against said flanges; in which said head is floatingly mounted; and which includes means to yieldingly urge the head against said flanges.

13. A head for reading a tape having a plurality of channels, comprising:

a pack of plates of nonconducting material arranged in face-to-face relation, each of said plates being relieved on at least one of its faces adjacent one edge thereof whereby the pack of plates forms a row of recesses open on one side of the pack at the junctures of the plates, said recesses corresponding to said channels;

means maintaining said pack under permanent compression to hold the plates together; and a corresponding plurality of means mounted in said recesses respectively to sense the signals recorded in the corresponding channels of the tape.

14. A combination as set forth in claim 13 in which the pack of plates is positioned between two clamp members; and in which means interconnects the two clamp members to hold the pack under permanent compression.

15. A combination as set forth in claim 14 which includes spacer means under compression between the two clamp members to limit the compression of the pack by the clamp members.

16. A combination as set forth in claim 14 in which said interconnecting means extends through aligned apertures in the plates.

17. A combination as set forth in claim 16 in which spacer means extends through aligned apertures in the plates; and in which said screw-threaded means holds the clamp members against the opposite ends of the spacer.

18. A combination as set forth in claim 17 in which said spacer means is hollow and said screw-threaded means extends through the hollow spacer means.

19. A head for mounting reading elements for reading a tape having $n$ number of channels spaced $d$ distance apart center to center, comprising: a stack of $n+1$ plates of plastic material, $n$ number of said plates being relieved on at least one side adjacent one edge thereof to form $n$ number of recesses at the junctures of the successive plates to receive said reading elements respectively, said plates having body portions with integral projections on the faces of the plates, the projection dimension of said projections being small relative to the thickness of the body portions of the plates and the total area of the projections being small relative to the area of the body portions whereby the projections rather than the bodies of the plates yield to compression force across the stack, each of said plates including its projections being of an over-all thickness of approximately $d$ dimension with a small plus tolerance whereby the unrestrained total thickness of the stack of plates is $d(n+1)$ plus an accumulated tolerance; and holding means for the stack compressing the stack to a total thickness of approximately $d(n+1)$ with corresponding compresion yield of the projections for precision spacing of the recesses across the head.

References Cited

UNITED STATES PATENTS

| | | | |
|---|---|---|---|
| 2,039,398 | 5/1936 | Dye | 29—446 |
| 2,886,651 | 5/1959 | Vogel | 179—100.2 |
| 3,008,220 | 11/1961 | Sammarco | 29—446 |
| 3,031,531 | 4/1962 | Thevenaz | 179—100.2 |
| 3,188,450 | 6/1965 | Wagemann | 235—61.11 |

DARYL W. COOK, *Acting Primary Examiner.*

J. SCHNEIDER, *Assistant Examiner.*